Figure 1:
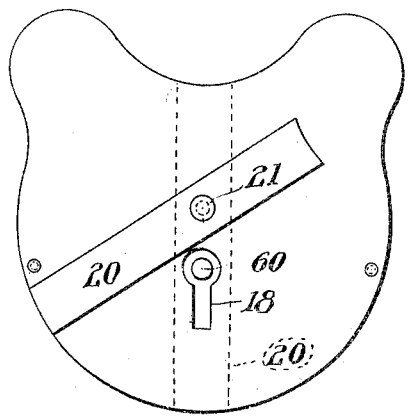

S. WOJCIECHOWSKI.
PADLOCK.
APPLICATION FILED JULY 3, 1914.

1,116,526.

Patented Nov. 10, 1914.
3 SHEETS—SHEET 1.

Witnesses
I. F. Jordsiewicz.
P. W. L. Bryant.

Inventor
S. Wojciechowski
By A. M. Wilson
Attorney

S. WOJCIECHOWSKI.
PADLOCK.
APPLICATION FILED JULY 3, 1914.

1,116,526.

Patented Nov. 10, 1914.
3 SHEETS—SHEET 2.

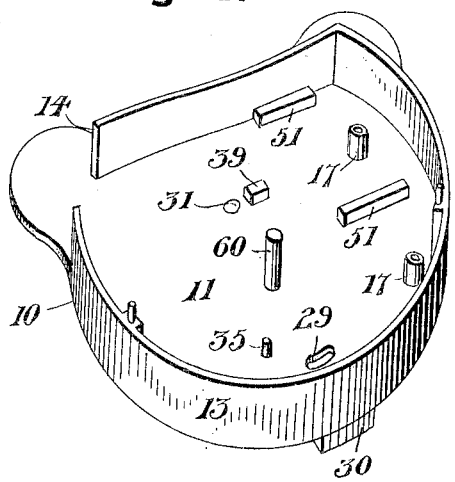
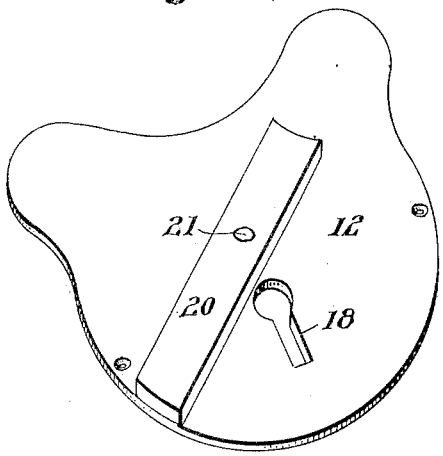
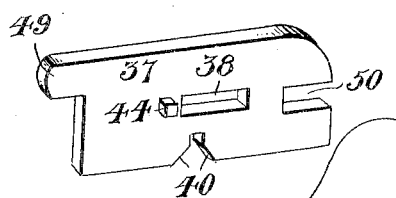
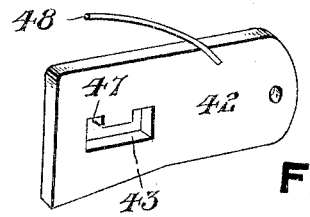
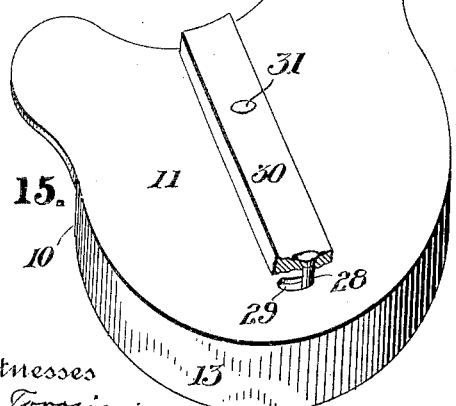
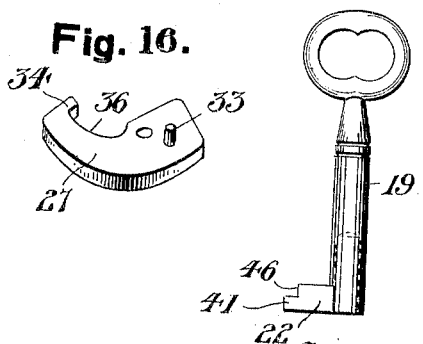

UNITED STATES PATENT OFFICE.

STEPHEN WOJCIECHOWSKI, OF BROOKLYN, NEW YORK.

PADLOCK.

1,116,526.  Specification of Letters Patent.  Patented Nov. 10, 1914.

Application filed July 3, 1914. Serial No. 848,783.

*To all whom it may concern:*

Be it known that I, STEPHEN WOJCIECHOWSKI, a subject of the Czar of Russia, residing at Brooklyn, in the county of Kings and State of New York, have invented certain new and useful Improvements in Padlocks, of which the following is a specification.

This invention relates to new and useful improvements in padlocks.

An object of the invention is to provide a padlock having both sides formed of identical appearance, a similar element upon one side constituting a key-hole guard and upon the other side an actuating means for a key safety catch.

A further object of the invention is to provide a false bottom within the lock casing to be engaged by the key when inserted in the lock and allowing an actuation of only sham lock elements instead of the bolt actuating mechanism.

A still further object is to provide a lock in which a person unfamiliar with the construction thereof would engage only a sham element upon inserting the key within the key-hole but which key may be readily engaged with the bolt throwing mechanism by one familiar with the lock construction, the lock also being provided with a key engaging catch which is required to be manually released from the exterior of the casing by a blind actuating bar before the key can be operatively turned in the lock.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—

Figure 3:
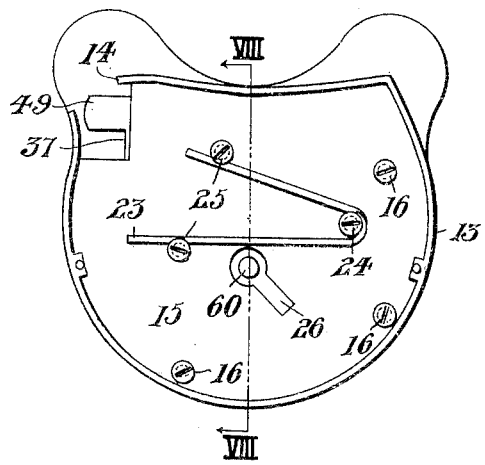
Figure 2:
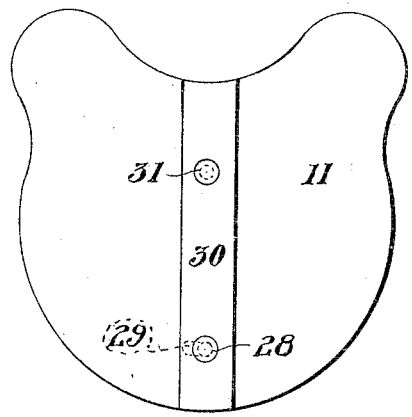
Figure 4:
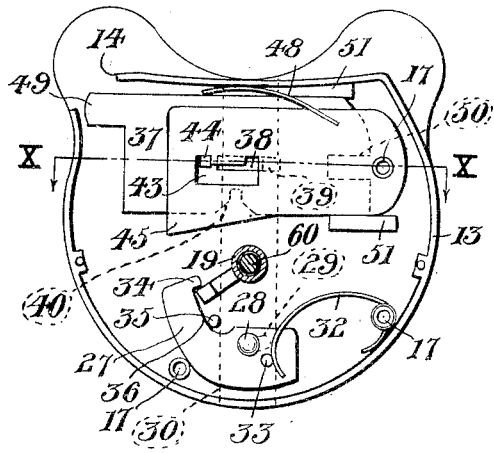
Figure 5:
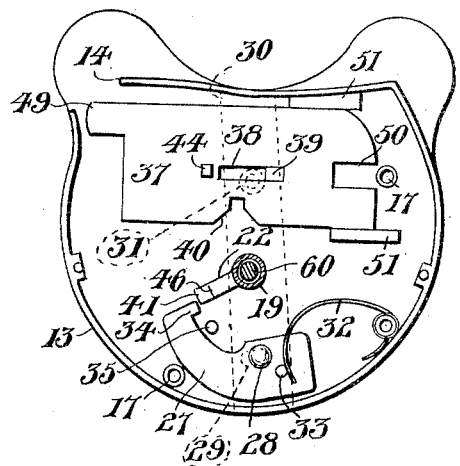
Figure 7:
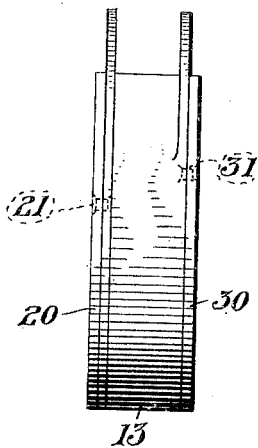
Figure 8:
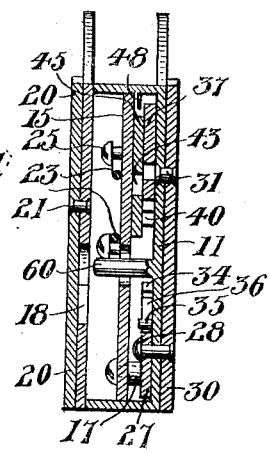
Figure 6:
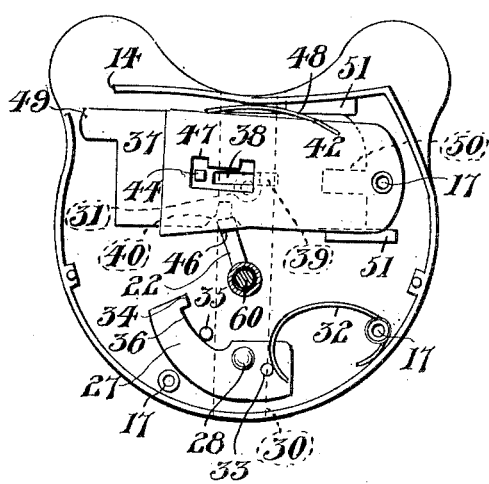
Figure 9:
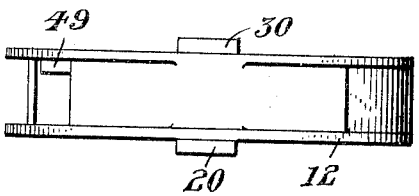
Figure 10:
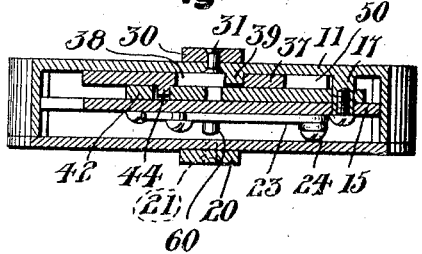

Figure 1 is a front elevation of the padlock with a key-hole guard moved to expose the key-hole. Fig. 2 is a rear elevation of the lock showing the key safety catch bar normally positioned. Fig. 3 is a view similar to Fig. 1 but with the front plate removed from the casing. Fig. 4 is a view similar to Fig. 3 but with the intermediate or false bottom plate removed and the key and post shown in section. Fig. 5 is a view similar to Fig. 4 showing the key safety catch released and with the actuating tumbler removed. Fig. 6 is a view similar to Fig. 4 and with the key partially rotated in the unlocking operation. Fig. 7 is a side elevation of the lock. Fig. 8 is a transverse sectional view taken upon line VIII—VIII of Fig. 3. Fig. 9 is a top plan view of the lock. Fig. 10 is a transverse sectional view taken upon line X—X of Fig. 4. Fig. 11 is a perspective view of the lock casing with the front plate and lock elements removed therefrom. Fig. 12 is a perspective view of the front plate removed. Fig. 13 is a perspective view of the shiftable bolt detached. Fig. 14 is a perspective view of the actuating tumbler detached. Fig. 15 is a perspective view of the lock casing showing the rear plate thereof and with the catch actuating bar broken away. Fig. 16 is a perspective view of the key safety catch, and Fig. 17 is a side elevation of the operating key.

Referring more in detail to the drawings, it is to be noted that the lock is provided broadly of the form of the usual padlock and consists primarily of the casing 10 as shown in Fig. 11 having a rear plate 11 and a removable front plate 12 and with an inclosing side wall 13 which is interrupted at one upper corner of the lock for forming an open slot 14 within which any desired form of keeper or hasp, which is not shown, may be inserted and withdrawn after the usual manner of padlock constructions. A false bottom or intermediate plate 15 substantially conforming to the interior dimensions of the side wall 13 is positioned within the casing and rigidly secured therein substantially midway between the front and rear plates by means of screws 16 engaging the posts 17 inwardly projecting from the rear plate 11 and upon which posts the intermediate plate is adapted to rest.

The front plate 12 is provided with a keyhole 18 therethrough which is adapted for the reception of the key 19, it being noted that a guard bar 20 is pivoted to the front plate as at 21 and adapted to be partially turned to cover the key-hole when the same is not desired for use. Upon placing the key through the front plate slot 18, the key will rest upon the intermediate plate 15 and upon being revolved in an attempt to release the locking bolt, the ward 22 of the key will engage the leaf spring 23 and by pushing the same aside during such turning of the key, an impression is given to the operator that the key is operatively positioned and that the lock is being actuated thereby, while as will be evident no effect whatever is produced upon the locking mechanism. The spring 23 is secured to the pin 24 upon the intermediate plate while the spring being tensioned, the ends thereof are normally engaged with the stop pins 25. A person familiar with the construction of the lock however may after placing the key through the front plate slot 18 partially turn the key so as to bring the same in alinement with the key-hole slot 26 of the intermediate plate and whereupon the key then passes through the intermediate plate and as illustrated in Fig. 4 is ready to actuate the lock.

A safety catch 27 is positioned within the casing and flatly engaging the inner face of the rear plate 11 being mounted upon a pivot pin 28 which passes through the slot 29 through the said plate 11 and is carried by the catch actuating bar 30 pivotally mounted upon the outer face of the rear plate by means of the pivot pin 31. A spring 32 secured to one of the posts 17 engages a lug 33 of the catch for normally holding the catch in a position shown in Fig. 4 and with the bar 30 positioned upon the central axis of the rear plate and with the end hook 34 of the catch in its innermost position where the same will be contacted by the key ward 22 upon a turning of the same and thus act as a stop for preventing the key from being turned in the lock to engage the tumbler and bolt. The catch 27 is slidably positioned between the adjacent one of the posts 17 and a stud 35 carried by the rear plate and positioned within a cut out portion 36 in the inner edge of the catch. Upon pivotally moving the bar 30 to one side, the catch is shifted against the action of the spring 32 while the sliding movement of said catch positions the stop lug 34 thereof out of the path of movement of the key, allowing the key to pass the same as shown in Fig. 5 for engaging the tumbler and bolt as best seen in Fig. 6. It will be noted that upon releasing the bar 30, the spring 32 again returns the catch to its normal operative position and it will be further seen that the bar 30 conforms in shape and appearance to the key-hole guard 20 and that said catch actuating bar will be positioned when operative similarly to the guard 20 when the latter is operatively positioned for closing the key-hole slot 18.

The sliding bolt 37 is provided with a slot 38 for receiving the rectangular stud 39 of the rear plate and is provided with a V-shaped notch 40 in its lower edge for the engagement of the projecting end 41 of the key ward in the shifting operation. The tumbler 42 is pivoted upon one of said posts 17 and is provided with a U-shaped slot 43 adapted for the reception of a stud 44 carried by the adjacent face of the bolt 37, while an inclined projection 45 upon the lower edge of the ward is adapted to be engaged by the edge 46 of the key ward. A movement of the key which is positioned upon the key post 60 of the rear plate, from the position shown in Fig. 5 to that shown in Fig. 6, engages the edge 46 of the key with the projection 45, thus elevating the tumbler to release the bolt stud 44 from the engaging notch 47 of the tumbler slot 43 and whereupon a further turning of the key engages the end 41 thereof within the bolt slot 40, thus retracting the bolt by moving the same toward the right. A spring 48 is secured to the tumbler 42 and engages the adjacent inner face of the casing wall 13 thus normally resiliently retaining the tumbler in its innermost position, as illustrated in Fig. 4. The unlocking of the bolt having been thus described, it is evident that the same is projected in the locking operation by a reverse movement. The bolt is provided with an engaging end 49 adapted to engage any keeper member that may be positioned within the slot 14 while an end slot 50 of the bolt is adapted to span the adjacent post 17 when the bolt is in its released position, the bolt being slidably mounted between the opposite blocks 51 carried upon the inner face of the rear plate 11 as well as being retained against lateral movement by means of the stud and slot heretofore described.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim as new is:—

1. A lock comprising a casing having a rear plate with a curved slot therethrough and a front plate having a key-hole, a guard bar exteriorly pivoted to the front plate and adapted for covering said key-hole, a safety catch for the lock key slidably mounted within said casing, a catch actuating bar exteriorly pivoted to the rear plate, a connecting pin between said catch and actuating bar extending through said curved slot, a spring engaging said catch and adapted for normally positioning said actuating bar in juxtaposed relation to said guard when the latter is in its slot closing position.

2. A lock comprising a casing having a front, rear and intermediate plate, key-hole slots through said front and intermediate plates and positioned out of alinement with each other, a tensioned spring upon said intermediate plate and positioned adjacent the key-hole slot of said intermediate plate.

3. A lock comprising a casing having a front, intermediate and rear plate positioned in parallelism, key-hole slots between said front and intermediate plates with the circular portions of said slots positioned in alinement with each other and with the lateral portions of said slots out of alinement with each other, a key post upon said rear plate extending through both of said slots, a tension spring secured to said intermediate plate and having one free end thereof positioned adjacent the key-hole slot of said intermediate plate.

4. A lock comprising a casing having a front, intermediate and rear plate positioned in parallelism, key-hole slots between said front and intermediate plates with the circular portions of said slots positioned in alinement with each other and with the lateral portions of said slots out of alinement with each other, a key post upon said rear plate extending through both of said slots, a tension spring secured to said intermediate plate and having one free end thereof positioned adjacent the key-hole slot of said intermediate plate, a slidable catch device upon the inner face of said rear plate and adapted for contact by the lock key when said catch is in its normal position and a releasing means for said catch slidably positioned and pivoted exteriorly of said rear plate.

5. A lock comprising a casing having a front, intermediate and rear plate positioned in parallelism, key-hole slots between said front and intermediate plates with the circular portions of said slots positioned in alinement with each other and with the lateral portions of said slots out of alinement with each other, a key post upon said rear plate extending through both of said slots, a tension spring secured to said intermediate plate and having one free end thereof positioned adjacent the key-hole slot of said intermediate plate, a slidable catch device upon the inner face of said rear plate and adapted for contact by the lock key when said catch is in its normal position and a releasing means for said catch slidably positioned and pivoted exteriorly of said rear plate, a key-hole guard pivoted exteriorly to said front plate and adapted for closing the key-hole therethrough when positioned in parallelism with said actuating bar, and tumbler and bolt mechanism positioned between said intermediate and rear plates.

In testimony whereof I affix my signature in presence of two witnesses.

STEPHEN WOJCIECHOWSKI.

Witnesses:
JOSEPH WARTSKI,
JOHN DANKSZO.

Copies of this patent may be obtained for five cents each, by addressing the "Commissioner of Patents, Washington, D. C."